United States Patent
Bryant et al.

(10) Patent No.: US 12,397,929 B2
(45) Date of Patent: Aug. 26, 2025

(54) METHOD OF FABRICATING AN AIRCRAFT STRUCTURAL COMPONENT

(71) Applicant: Airbus Operations Limited, Bristol (GB)

(72) Inventors: Stuart Bryant, Bristol (GB); Thomas Barnett, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/584,454

(22) Filed: Feb. 22, 2024

(65) Prior Publication Data

US 2024/0286762 A1 Aug. 29, 2024

(30) Foreign Application Priority Data

Feb. 24, 2023 (GB) ...................................... 2302753

(51) Int. Cl.
*B64F 5/10* (2017.01)
*B64C 3/18* (2006.01)

(52) U.S. Cl.
CPC ................ *B64F 5/10* (2017.01); *B64C 3/182* (2013.01)

(58) Field of Classification Search
CPC . B64F 5/10; B64C 3/182; B29C 69/02; B29C 70/56; B29C 70/28; B29C 70/30; B29B 11/16; B29L 2031/3085
See application file for complete search history.

(56) References Cited

U.S. PATENT DOCUMENTS

| | | |
|---|---|---|
| 5,919,543 A | 7/1999 | McCarville |
| 6,520,706 B1 | 2/2003 | McKague, Jr. |
| 7,080,805 B2 | 7/2006 | Prichard |
| 7,642,481 B2 | 1/2010 | Kismarton |
| 7,681,835 B2 | 3/2010 | Simpson |
| 7,943,076 B1 * | 5/2011 | Hawkins ............... B29C 70/545 156/196 |
| 11,273,899 B2 | 3/2022 | Achtner |

(Continued)

FOREIGN PATENT DOCUMENTS

WO WO-2021171488 A1 * 9/2021

OTHER PUBLICATIONS

British Search Report for Application No. 2302753 dated Aug. 18, 2023.

(Continued)

*Primary Examiner* — Justin M Benedik
(74) *Attorney, Agent, or Firm* — KDW Firm PLLC (57) ABSTRACT

A method of fabricating an aircraft structural component for an aircraft includes providing a component precursor with a web and a flange. The web has a length, height shorter than the length, thickness shorter than the height, first end proximal to the flange and second end distal from the flange. A force is applied to the component precursor with a magnitude varying along the web height from a minimum at one of the first and second ends to a maximum at another of the first and second ends to increase length of the web to different extents. Then shaping the component precursor includes curving the component precursor into a curved shape having a first radius of curvature at the one of the first and second ends and a second radius of curvature at the another of the first and second ends, the second radius of curvature greater than the first.

19 Claims, 7 Drawing Sheets

(56) References Cited

U.S. PATENT DOCUMENTS

| | | | |
|---|---|---|---|
| 2007/0056246 A1 | 3/2007 | Escobar Benavides | |
| 2010/0285265 A1* | 11/2010 | Shinoda ................. | B32B 5/022 |
| | | | 428/80 |
| 2014/0065354 A1* | 3/2014 | Smith, Jr. ........... | B32B 38/0012 |
| | | | 156/196 |
| 2016/0089866 A1* | 3/2016 | Garcia Martin ........ | B32B 37/14 |
| | | | 156/161 |
| 2017/0095983 A1 | 4/2017 | Offensend | |
| 2019/0091945 A1* | 3/2019 | Gordon .................. | B29C 70/52 |
| 2021/0155336 A1 | 5/2021 | Wadsworth | |

OTHER PUBLICATIONS

British Search Report for Application No. 2302754 dated Aug. 18, 2023.

* cited by examiner

METHOD OF FABRICATING AN AIRCRAFT STRUCTURAL COMPONENT

TECHNICAL FIELD

The disclosure herein relates to methods of fabricating structural component for aircraft.

BACKGROUND

In an aircraft, a curved shape is desirable for aerodynamic and weight saving purposes in some parts, such as the wings or the fuselage. These parts normally comprise a skin at the surface. The skin is curved to accommodate or provide the required shape. The curved skin requires structural supports to be attached to it in order to have the structural rigidity suitable to withstand the severe demands of the operating conditions of the aircraft, such as the pressure in the cabin or the lift forces on the wing. The structural supports are thus subject to strict quality requirements.

It is desirable to provide aircraft parts with tight curvature. Doing so will reduce the design constrains and permit, for example, aircraft design closely inspired by natural shapes. Such aircraft parts in turn require structural supports with the desired curvature while complying with the property criteria for application in aircraft.

SUMMARY

A first aspect of the disclosure herein provides a method of fabricating an aircraft structural component for an aircraft, the method comprising: providing a component precursor comprising a web and a flange that extends from the web, wherein the web has a length, a height which is shorter than the length, a thickness which is shorter than the height, a first end proximal to the flange and a second end distal from the flange, applying a force to the component precursor with a magnitude that varies along the height of the web from a minimum at one of the first and second ends of the web to a maximum at the other of the first and second ends of the web, so as to increase the length of the web to different extents between the first end of the web and the second end of the web, and then shaping the component precursor, the shaping comprising curving the component precursor into a curved shape, wherein the curved shape has a first radius of curvature at one of the first and second ends of the web and a second radius of curvature at the other of the first and second ends of the web, wherein the second radius of curvature is greater than the first radius of curvature.

As a result, there is a minimum (such as zero) increase in length at one of the first and second ends of the web and a maximum increase in length at the other of the first and second ends of the web. As parts of the web have been deformed to different extents and have different lengths, this will result in the web having a shape that differs from a shape it had before the force was applied. The shaping may then be performed in such a way that the resultant aircraft structural component need not undergo a (significant) compressive force in the length direction and thus is free from wrinkles. In contrast, had the shaping been performed by other methods without implementation of the disclosure herein, then wrinkles could be formed in portions of the web that have to be compressed in the length direction to obtain the desired shape of the aircraft structural component.

Optionally, the force is applied to the component precursor by pulling on the web in a direction exactly parallel to the length of the web or by pulling on the web in a direction that has a component that is parallel to the length of the web. The force is thus tension. Either way, the web experiences a force with at least a component in the length direction, and thus becomes elongated over at least part of its height.

Optionally, the force is applied perpendicularly to the length of the web such that a tension is generated locally in some parts of a material making up the component precursor, thus producing the same effect as applying a tension directly along the length of the web. Application of such a force may be performed before, or at the same as, the shaping of the component precursor.

Optionally, the component precursor comprises a composite material.

Composite materials are used in aircraft due to their advantageous mechanical properties and low density. Low density permits a reduction in weight of the aircraft, for fuel efficiency purposes or to enable the aircraft to carry a greater load for a given engine rating, while the mechanical properties make composite materials suitable for the strict requirements for use in aircraft.

Optionally, the composite material is a fiber composite material. Further optionally, the fiber composite material comprises fibers that are parallel to the length of the web and have a length which is less than half of the length of the web.

Fiber composites comprise fibers as reinforcement of a light material, normally a resin or another polymer. This allows the advantageous properties of the fibers, such as their tensile strength, and of the polymer, such as its low density, to be harnessed.

Optionally, the fiber composite material comprises pre-impregnated fibers, curable into a rigid fiber composite material.

Pre-impregnated fibers may be cured into a rigid composite material, they are shapeable in their uncured form, and curable in a relatively simple process following or during shaping.

Optionally, the component precursor comprises dry fibers that are permeable by a matrix material that is curable to form a rigid fiber composite material with the fibers.

Dry fiber processes add additional complexity in term of additional steps to obtain a rigid composite material, but the composite material made this way is generally lighter and stronger compared to other methods of fabrication of the fiber composite material.

Optionally, the minimum is zero. Alternatively, the minimum is non-zero.

Optionally, the magnitude that varies along the height of the web varies linearly from the maximum to the minimum.

A linear variation from the maximum to the minimum is a simple way to introduce the variation along the height of the web, and can result in an aircraft structural component that has linear ends at the longitudinal ends of the web.

Optionally, the minimum is at the first end of the web and the maximum is at the second end of the web.

Accordingly, during subsequent shaping of the component precursor into the form required for the aircraft structural component, the web can take a curved form with the second end of the web having a greater radius than the first end of the web, which can be particularly beneficial in some circumstances such as those where the flange is to be attached to a convex surface in subsequent use of the aircraft structural component.

Optionally, the curved shape has the first radius of curvature at the first end of the web and the second radius of curvature at the second end of the web.

Upon a releasing of the force, there is a difference in length between the first end of the web and the second end of the web, and the component precursor is shapable into the curved shape with the difference in length accounting for any difference in length which would otherwise be introduced by introducing the curvature, and which without the implementation of the disclosure herein would result in wrinkling of the web. To produce an aircraft structural component wherein the curvature is towards the flange, the maximum length needs to be produced at the second end of the web, opposite to the first end which the flange extends from.

Optionally, the method comprises curing the component precursor during or after the shaping.

Curing the component precursor allows the component shape to be set to produce a rigid component.

Optionally, the flange extends from the web substantially perpendicularly.

A perpendicular orientation of the flange with respect to the web tends to provide an aircraft structural component that is more rigid in two dimensions. It can also facilitate use of the aircraft structural component in a typical aircraft architecture where holes for the passage of such components, such as in a rib in a wing, are formed with an expectation that the flange will be perpendicular to the web. Such holes are also more easily formed than holes to accept components in which the flange is at a non-perpendicular angle to the web.

Optionally, the aircraft structural component is a stringer.

A skin section of a wing or a fuselage may be attached to a stringer for structural support. Stringers are conventionally curved through large radii where wrinkles in the material of the web of the stringer are avoided due to the inherent small degree of "play" in the material, allowing the material to stretch or resize sufficiently to avoid wrinkling. If stringers with tighter curvature are desired, embodiments of the disclosure herein enable them to be provided to a satisfactory standard.

A second aspect of the disclosure herein provides an aircraft structural component fabrication apparatus to perform the method comprising: a force applicator configured to perform the applying force to the component precursor, and a jig on which the shaping of the component precursor is performable.

Optionally, the force applicator comprises: a plurality of clamps removably attachable to portions of a longitudinal end of the web at respective points along the height of the web, wherein the clamps are operable independently of each other to hold the web during the applying the force with the magnitude that varies along the height of the web so as to increase the length of the web to different extents between the first end of the web and the second end of the web.

Such a set of clamps provides a relatively simple and versatile means to apply force, such as tension, with a magnitude that varies along the height of the web.

Optionally, a second such plurality of such clamps is provided and is similarly removably attachable to portions of the other longitudinal end of the web at respective points along the height of the web.

First and second pluralities of clamps may be attached to the respective longitudinal ends of the web. The force may then be applied perpendicularly to the length of the web such that a tension is generated locally in some parts of a material making up the component precursor, thus producing the same effect as applying a tension directly along the length of the web. Application of such a force may be performed at the same time as the component precursor is shaped on the jig, for example. Alternatively, it could be formed before the component precursor is shaped on the jig, or even located on the jig.

Providing such a second plurality of clamps allows the force applied to respective points along the height of the web to be accurately and independently applied and controlled.

Optionally, each of the clamps has a resilient contact surface and the clamps are configured to grip the web via the respective resilient contact surfaces.

This helps to protect the web from damage by the clamps.

A third aspect of the disclosure herein provides an aircraft structural assembly, comprising: an aircraft structural component fabricated by the method of the first aspect of the disclosure herein, and an aircraft skin section affixed to the flange of the aircraft structural component.

The affixing may be done by mechanical fasteners, such as bolts or rivets, or using a welding process (if the flange is of a weldable material) or an adhesive process or any other suitable method. The assembly may, for example, be a wing and/or a fuselage of the aircraft. Wings and fuselages are examples of aircraft structural assemblies with curvature where structural support is required. The assembly provides particular advantages, at least in enabling desired curvature to be achieved.

A fourth aspect of the disclosure herein provides an aircraft comprising the aircraft structural assembly of the third aspect of the disclosure herein.

An aircraft with curved portions unachievable by known methods may be fabricated through implementation of the disclosure herein, as the shape of the assembly, for example the wing or the fuselage, is not so limited by the curvature restrictions previously imposed. This may result in more optimal tailoring of the shape of the assembly for aerodynamic or lift properties, structural resilience, weight savings or other benefits.

BRIEF DESCRIPTION OF THE DRAWINGS

Embodiments of the disclosure herein will now be described, by way of example only, with reference to the accompanying drawings, in which.

DETAILED DESCRIPTION

It is known in comparative examples for aircraft structural components, such as stringers, to suffer from unacceptable levels of wrinkling, when fabricated with small-radii curvatures. As previously outlined, small-radius curvature in structural components may be desirable to support the skin in small-radius curved aircraft parts, which seek to improve the overall performance of the aircraft. In comparative manufacturing techniques for a curved stringer comprising a flange and a web extending from the flange, for example, wrinkling can occur in the web or flange during bending of the stringer following laying up in a flat rectangular state. This wrinkling is due to a difference in length of the two respective ends of the web (one of which is proximal the flange and the other of which is distal from the flange) after bending, which results in an excess of material of the bent component at the inner, or smaller, radius end of the web. In the example embodiment described below, were the disclosure herein not implemented, the excess would be formed at an end of the web proximal to the flange and the flange would also wrinkle. Wrinkling would be detrimental to the performance of the structural component, and so avoiding or minimizing such wrinkles has until now been a limitation on the achievable curvature in aircraft components. A wrinkle or wrinkling can be considered a deviation, over a short distance of, for example, less than 10 cm, or less than 5 cm, or even less than 10 mm in the direction of the length of the component, of the web or the flange from its remaining general profile or path. Some such wrinkles or wrinkling may comprise folds in the web or the flange.

Embodiments of the disclosure herein seek to overcome the issue of wrinkling in such components by preventing or limiting the generation of excess material when forming a bent component. This is done by modifying the length of a component precursor by a varying magnitude between what will become an inner and an outer radius of curvature in the finished product. Such wrinkle mitigation reduces the likelihood of harmful points of stress concentrations, which could otherwise present an unacceptable level of failure risk in the finished product.

Figure 1:
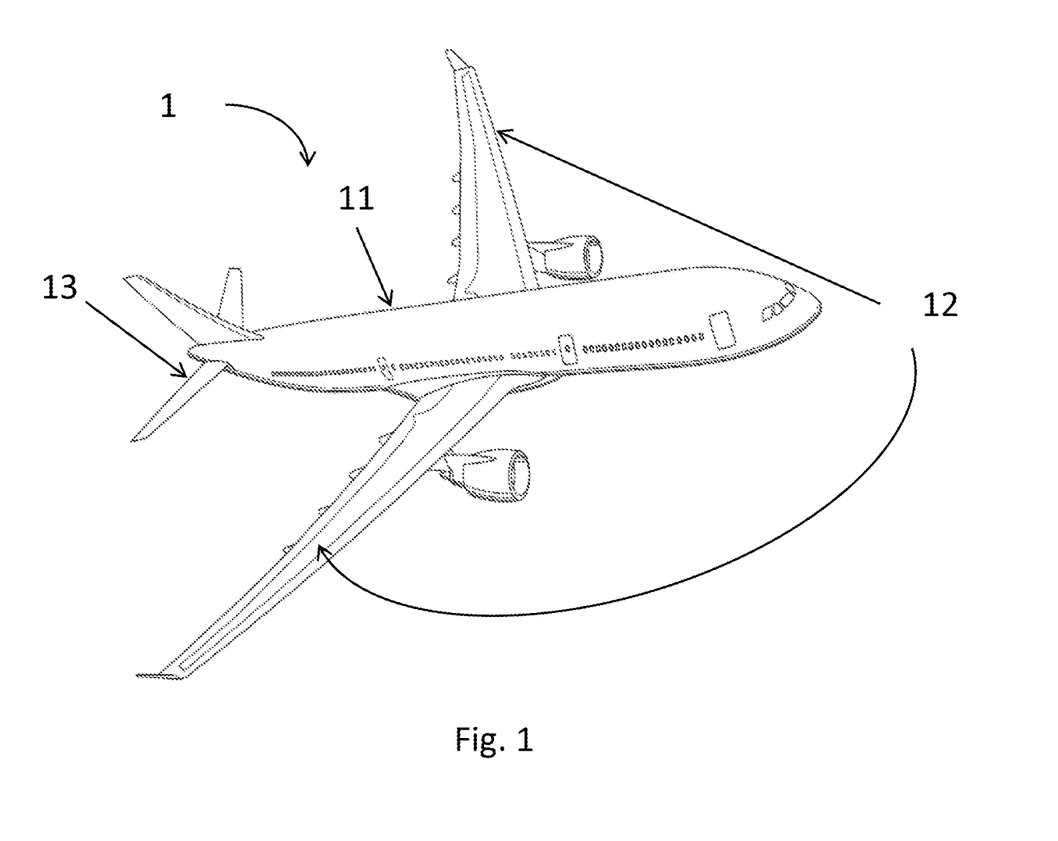
FIG. 1 shows a schematic view of an aircraft according to an example of the disclosure herein.

FIG. 1 shows an example of an aircraft 1 according to an example of the disclosure herein. The aircraft has multiple structural assemblies that may benefit from design unrestricted by curvature limits. Such assemblies are included in the fuselage 11, the wings 12, and the tail 13.

Figure 2:
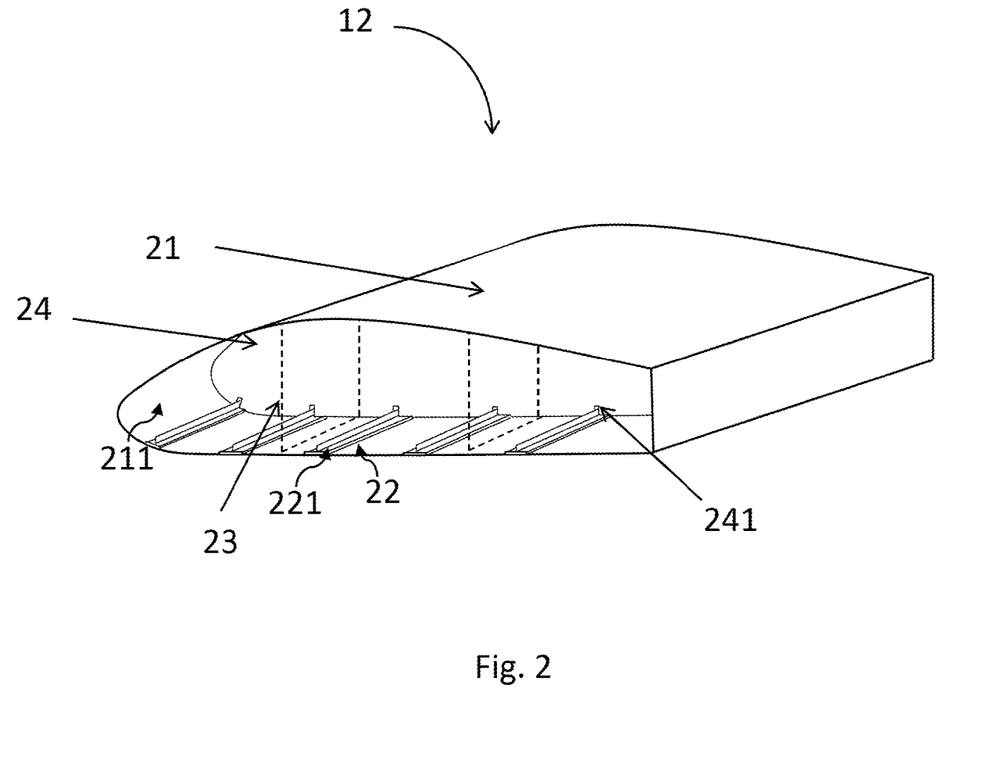
FIG. 2 shows an aircraft structural assembly according to an example of the disclosure herein.

A cross section through one of the wings 12 of the aircraft 1 is shown in FIG. 2. The wing 12 is an aircraft structural assembly and comprises a skin 21 defining its outer surface, spars 23 (shown in dashed lines in FIG. 2) and ribs 24 (only one of which is visible in FIG. 2) supporting the skin 21, and a series of stringers 22. The rib 24 has openings 241 to accommodate the stringers 22 passing through the opening. The stringers 22 are attached to the inner surface 211 of skin section 21 at their respective flanges 221. This is achievable by mechanical joining, for example by mechanical fasteners such as rivets or bolts (not shown). Alternatively, other joining methods such as adhesives or welding can be envisaged. A stringer is an example of an aircraft structural component which can be made by the method disclosed therein.

Figure 3A:
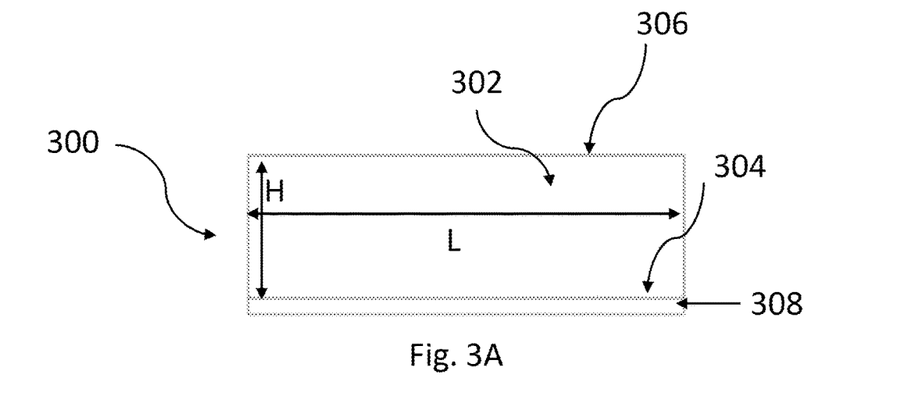
FIGS. 3A to 3C show, respectively, a side view of an aircraft structural component precursor according to an embodiment of the disclosure herein, a cross-sectional view and a top-down view of the same.

A component precursor to an aircraft structural component according to an embodiment of the disclosure herein is shown in FIG. 3A. In this example embodiment, the component precursor 300 is a stringer precursor. In other words, it is a forerunner to a stringer, or the part from which the stringer will derive. The component precursor 300 is made of a carbon fiber composite material, in this example embodiment. Other alternative materials include, for example, other fire composite materials such as glass fiber, or other composite or non-composite materials such as metallic materials. Composite materials are employed for aircraft components as they are lightweight and have favorable mechanical properties such as strength and stiffness.

Figure 3B:
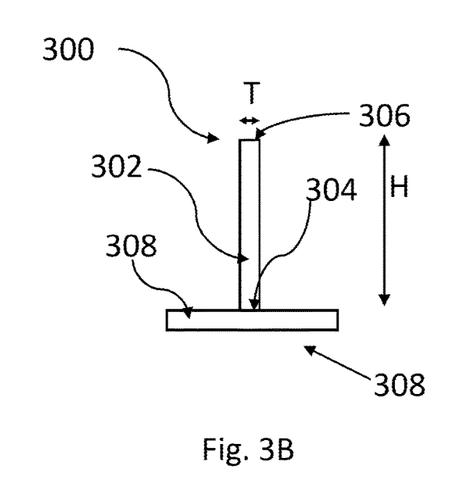
Figure 3C:
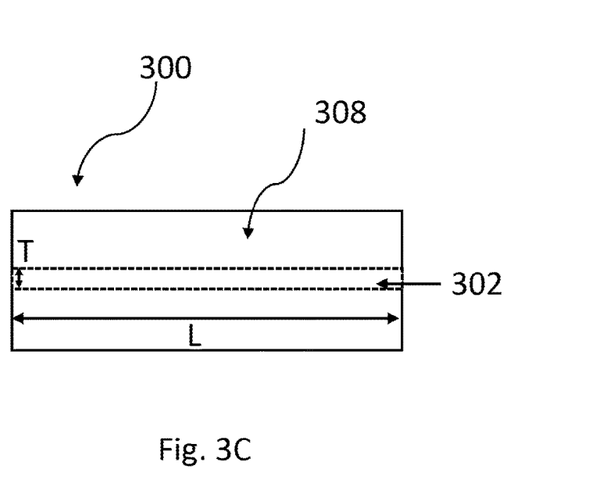

The component precursor comprises a web 302, which has a length L and a height H. The height H is perpendicular to the length L. A flange 308 extends perpendicularly from a first end 304 of the web 302, and the web 302 also has a second end 306 distal from the flange 308. The component precursor 300 is depicted in a cross-sectional view in FIG. 3B, wherein it is shown that the web 302 also has a thickness T. The thickness T is perpendicular to the length L and the height H. A further view of the component precursor 300 is shown in FIG. 3C in a direction of the height H of the web 302 (shown here in dashed lines). In this embodiment, the web 302 and flange 308 provide a 'T'-shape cross section component precursor, as best understood from FIG. 3B. Other arrangements are possible, and may be desirable for different structural applications. An alternative example embodiment of a component precursor 310 in an 'L'-shape cross section is shown in FIG. 3D-3E.

Figure 3D:
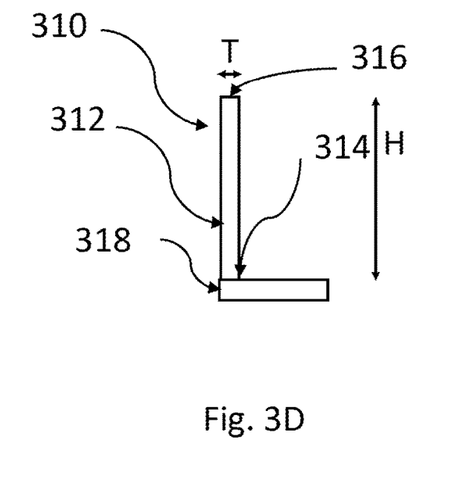
FIGS. 3D and 3E show an alternative example embodiment of an aircraft structural component precursor according to an embodiment of the disclosure herein in a cross-sectional view and a top-down view, respectively.

In FIG. 3D, a cross sectional view of a component precursor 310 is shown, with a flange 318 extending perpendicularly from a first end 314 of the web 312, and the web 312 also having a second end 316 distal from the flange 318. It will be appreciated that the side-on view of the component precursor 310 would be identical to that of the component precursor 300 shown in FIG. 3A and so is not repeated. A top-down view, in a direction of the height H of the web 312 of the component precursor 310, is shown in FIG. 3E. Here it can be seen that the flange 318 extends from the web 312 (shown here in dashed lines) in only one direction, so that together the web 312 and the flange 318 mean that the component precursor 310 defines an L-shape.

Figure 3E:
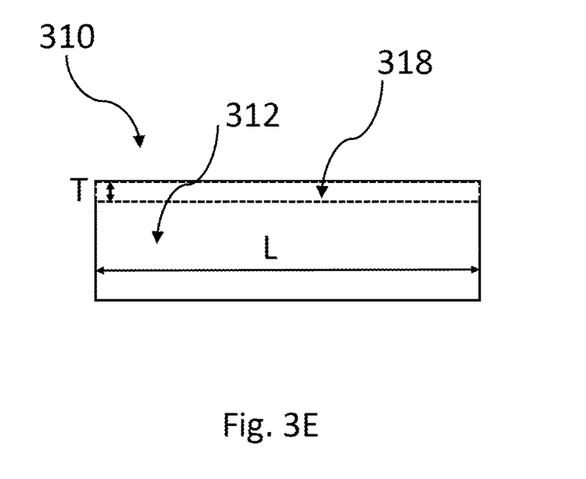
Figure 3F:
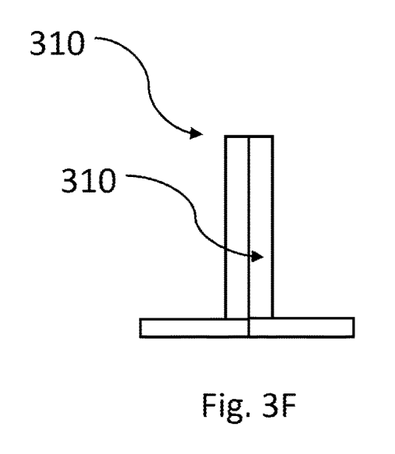
FIGS. 3F and 3G show an alternative arrangement of the aircraft structural component precursor of FIGS. 3D and 3E, in a cross-sectional view and a top-down view, respectively.
Figure 3G:
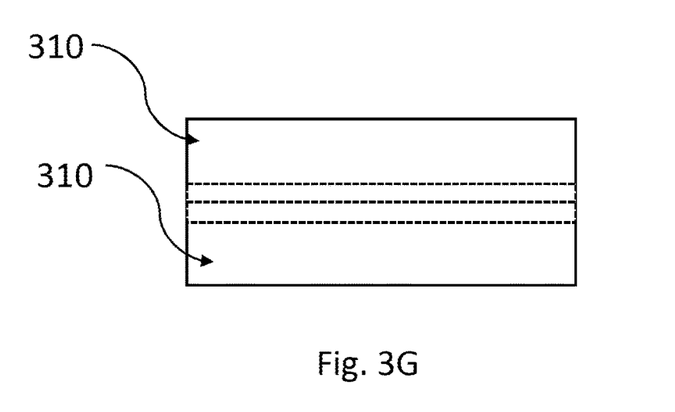

Two of the 'L'-shape cross section component precursors 310 shown in FIGS. 3D and 3E may be brought together with major faces of their respective webs abutting, to form a 'T'-shape component, as is depicted in a cross-sectional view in FIG. 3F and in a top-down view in FIG. 3G. This way, manufacturing one shape of component precursor 310 gives rise to two possible configurations of component precursor in practice, increasing versatility. Such an 'L'-shape cross section component precursor 310 may be simpler to manipulate during further processing, due to having two flat sides on which it can rest for shaping, for example.

A method 400 according to an example embodiment of the disclosure herein will now be described with reference to FIGS. 4A-4D and the component precursor 300 of FIGS. 3A-3C, but the method may be equally applied to the component precursor 310 discussed above or to another component precursor with a different cross section shape or format.

Figure 4A:
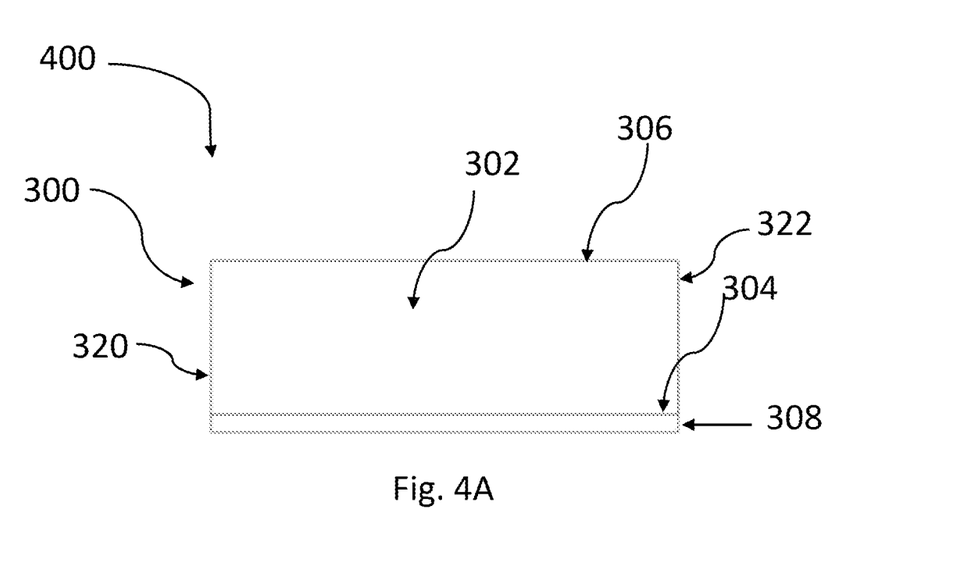
FIGS. 4A to 4D illustrate the performance of a method according to an embodiment of the disclosure herein.
Figure 4B:
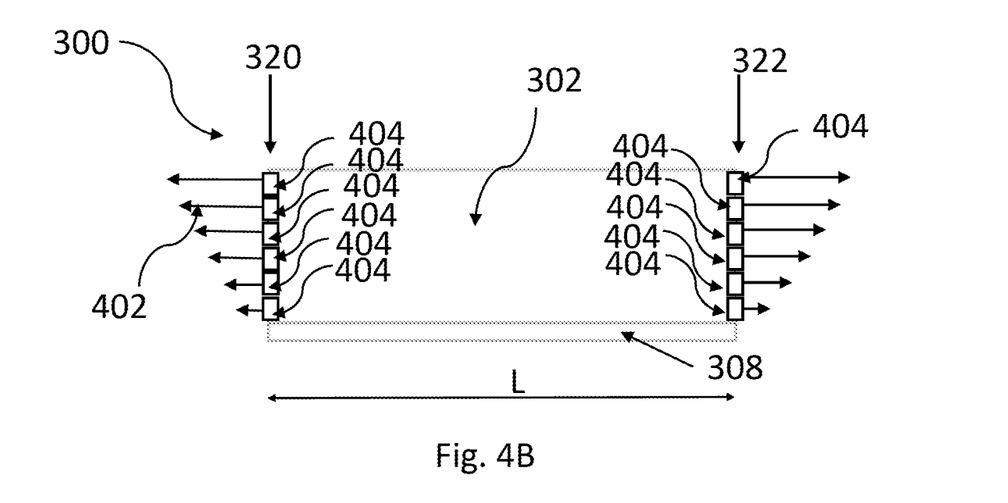

As noted above, the component precursor 300, shown again in FIG. 4A, comprises the web 302 with the first end 304, from which the flange 308 extends, and the second end 306, distal from the flange 308. The component precursor 300 also has first 320 and second 322 longitudinal ends. The method 400 comprises applying a tension 402 to the web 302 and the flange 308, as shown in FIG. 4B, in a direction parallel to the length L of the web 302 to elastically deform the web 302 and the flange 308. The arrows are used here to represent the tension 402 applied to the web 302 and the flange 308 at the first longitudinal end 320 and the second longitudinal end 322 of the component precursor 300, with the arrows having a length proportional to a magnitude of the tension applied and a direction indicative of a direction of the tension applied. The magnitude of tension varies, in this embodiment, linearly from a minimum at the first end 304 of the web 302 to a maximum at the second end 306 of the web 302.

In other envisaged embodiments, the magnitude of tension may vary in a different manner. The magnitude of the tension may for example, vary nonlinearly. Alternatively, or in addition, locations where a maximum and a minimum magnitude of tension is applied can be reversed as compared to the locations shown in FIG. 4B.

In this embodiment of the method 400, the component precursor 300 is grasped by a set of clamps 404. Each of the first longitudinal end 320 and the second longitudinal end 322 of the component precursor 300 is clamped with a respective plurality of the clamps 404. Pairs of associated ones of the clamps 404 at opposite longitudinal ends of the web 302 apply different respective magnitudes of tension to respective portions of the respective longitudinal ends 320, 322 of the component precursor 300, the portions being adjacent each other in the direction of the height H. This is performed by the two pluralities of clamps 404 being driven or biased apart, by varying degrees as dictated by the required varying tension.

Figure 4C:
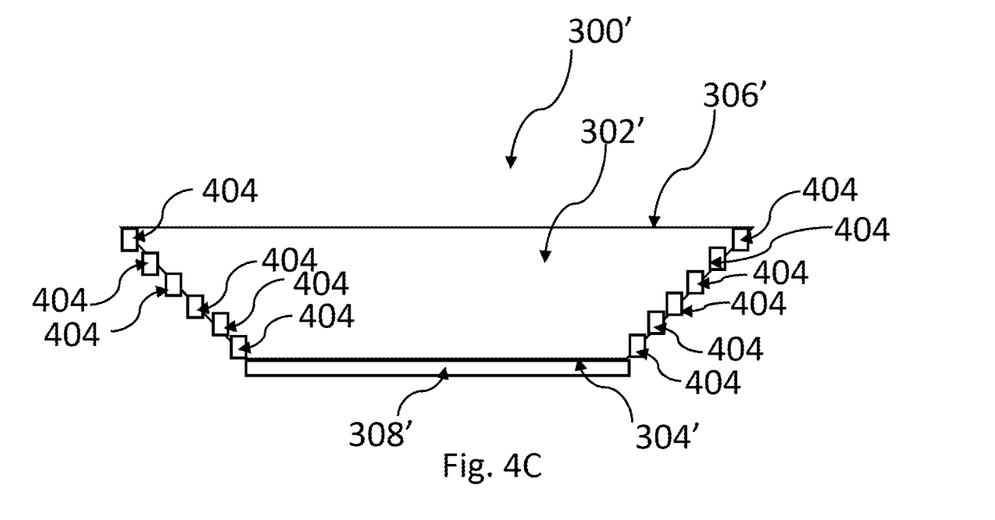

In FIG. 4C, the component precursor 300 is shown in the deformed state. In this figure, the respective elements have the same reference numerals as used in FIG. 4B but followed by an apostrophe. The clamps 404 are also shown. At this stage, the first end 304' of the web 302' is shorter than the second end 306' of the web 302'. This difference in length is produced due to the magnitude of tension being smaller at the first end 304' of the web 302' than at the second end 306' of the web 302'. In other words, the length L of the web 302' varies from the minimum at the first end 304' of the web 302' to a maximum at the second end 306' of the web 302', in accordance with the magnitude of tension 402 depicted previously in FIG. 4B. The tension may be released and component precursor 300' shaped into the shape required for the aircraft structural component. The releasing may occur before, during or after shaping.

Figure 4D:
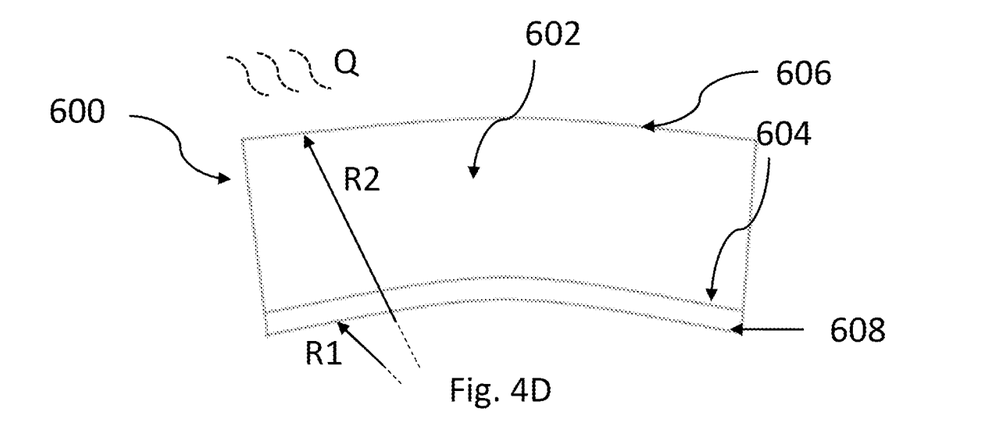

The resultant final component 600 is shown in FIG. 4D, with the web 602 now in curved form, with a first end 604 from which a flange 608 extends, and a second end 606 distal from the flange 608. The first end 604, the second end 606 and the flange 608 are formed from the respective first end 304', second end 306' and flange 308' of the component precursor 300. Then the component 600 is heated with heat Q in order to cure the component material into a rigid form. This curing preserves the shape of the final component 600. Curing by applying the heat Q can occur at the same time as the shaping mentioned above, or after the final shape has been reached. In other embodiments, curing may occur spontaneously at room temperature after a specific time interval and/or a catalyst chemical may be applied to trigger the curing, or no curing may be necessary, for example. Curing is usually necessary for fiber composites such as the presently described embodiment or other materials comprising resins or polymers. The particular process used to cure the composite depends on the type of composite or other material used. In the present example, a pre-impregnated fiber composite precursor component may be cured in order to render a polymer matrix, which is binding fibers of the fiber composite, rigid. Other processes are envisaged, where a material to form the matrix is introduced after the tensioning or sectioning action has been performed, for example.

The length of the first end 604 of the web 602 is shorter than the length of the second end 606 of the web 602 as a result of the different magnitude of tension which had been applied to it as previously described, producing a different permanent deformation in the material which varies in extent accordingly. This permits the first end 604 of the web 602 to be at an inner radius of curvature R1 and the second end 606 of the web 602 to be at an outer (and thus greater) radius of curvature R2, without wrinkles occurring in the web 602 to accommodate excess length which would otherwise be produced at the first end 604 of the web 602, had the disclosure herein not been utilized.

In alternative embodiments of the method, the location of the maximum and minimum magnitudes of the tension applied may be reversed (i.e., the maximum magnitude of tension being applied at the first end 304 of the web 302 and the minimum magnitude of tension being applied at the second end 306 of the web 302) so that the longest and shortest lengths of the ends of the web, and consequently the inner and outer radii of curvature in the final component, are produced at the reversed first and second ends of the web.

Figure 5:
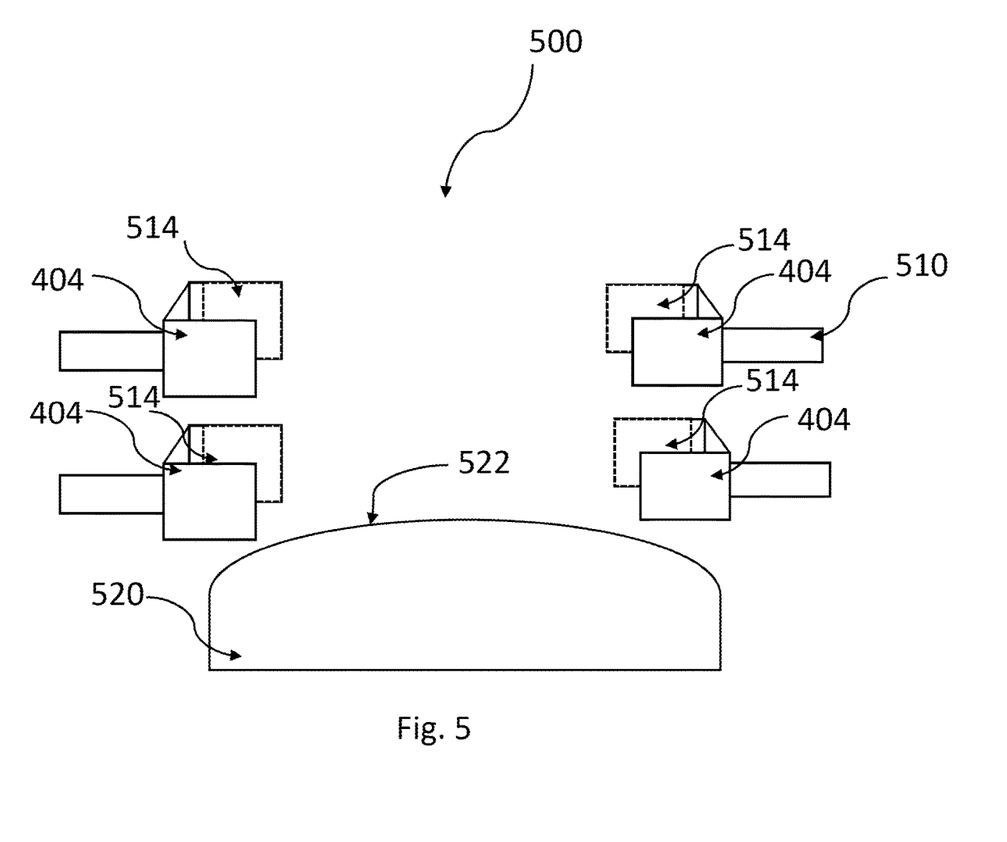
FIG. 5 shows a schematic depiction of an apparatus according to an embodiment of the disclosure herein, to perform the method of FIGS. 4A to 4D.

An apparatus 500, according to an embodiment of the disclosure herein, is depicted schematically in FIG. 5. The apparatus 500 is for performing the method 400 described above. The apparatus 500 comprises a tensioner 510 that comprises the two opposing pluralities of clamps 404 discussed above. The clamps 404 are to grip and apply tension to the component precursor 300. Each clamp 404 is operable independently of each other clamp 404 to apply a variable magnitude of tension, as required for the shape required for the aircraft structural component 600, as discussed above. Each clamp 404 has a resilient contact surface 514. The resilient contact surfaces 514 are to contact the component precursor 300 in a way which mitigates damage to the component precursor 300, as it may be fragile in its uncured (soft) state. The apparatus 500 also comprises a jig 520, with a curved surface 522, to support the component precursor/aircraft structural component during the method 400 and to guide the shaping of the elastically deformed component precursor 300' into a shape required for the aircraft structural component 600.

Alternative embodiments of the apparatus may comprise a different number of clamps than present in the apparatus 500 of FIG. 5, and/or a different form of tensioner to apply tension to the component precursor. Each of the components of the apparatus 500 may be independently operable by a human operator or may be automated as part of a production line.

In other envisaged embodiments, the clamps may not be utilized to apply tension to the component precursor. A differing mechanism to apply tension to the component precursor may be utilized instead, for example a plurality of hooks or clasps woven into the fibers of the fiber composite material of which the component precursor is made.

It is to be noted that the term "or" as used herein is to be interpreted to mean "and/or", unless expressly stated otherwise.

It should be understood that modifications, substitutions and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of fabricating an aircraft structural component for an aircraft, the method comprising:
 providing a component precursor comprising a web and a flange that extends from the web, wherein the web has:
  a length;
  a height which is shorter than the length;
  a thickness which is shorter than the height;
  a first end proximal to the flange; and
  a second end distal from the flange;
 applying a force to the component precursor with a magnitude that varies along the height of the web to increase the length of the web to different extents between the first end of the web and the second end of the web, wherein the magnitude of the force applied to the component precursor varies from being:
  a minimum force magnitude at the first end of the web and a maximum force magnitude at the second end of the web; or
  the minimum force magnitude at the second end of the web and the maximum force magnitude at the first end of the web; and
 then shaping the component precursor by curving the component precursor into a curved shape that has;
  a first radius of curvature at the first end of the web and a second radius of curvature at the second end of the web; or
  the first radius of curvature at the second end of the web and the second radius of curvature at the first end of the web:
  wherein the second radius of curvature is greater than the first radius of curvature.

2. The method according to claim 1, wherein the component precursor comprises a composite material.

3. The method according to claim 2, wherein the composite material is a fiber composite material.

4. The method according to claim 3, wherein the fiber composite material comprises fibers which are parallel to the length of the web and have a length which is less than half of the length of the web.

5. The method according to claim 3, wherein the fiber composite material comprises pre-impregnated fibers, curable into a rigid fiber composite material.

6. The method according to claim 1, wherein the component precursor comprises dry fibers that are permeable by a matrix material that is curable to form a rigid fiber composite material with the fibers.

7. The method according to claim 1, wherein the magnitude that varies along the height of the web varies linearly along the height of the web, from the maximum force magnitude to the minimum force magnitude.

8. The method according to claim 7, wherein the minimum force magnitude is at the first end of the web and the maximum force magnitude is at the second end of the web.

9. The method according to claim 8, wherein the curved shape is formed such that the first radius of curvature is at the first end of the web and the second radius of curvature is at the second end of the web.

10. The method according to claim 1, comprising curing the component precursor during or after the shaping of the component precursor.

11. The method according to claim 1, wherein the flange extends perpendicularly from the web.

12. The method according to claim 1, wherein the aircraft structural component is a stringer.

13. The method according to claim 1, wherein the force applied to the component precursor that has a magnitude that varies along the height of the web to increase the length of the web is applied at opposing ends of the web.

14. The method according to claim 13, comprising:
 attaching a set of clamps along the height of the web at both longitudinal ends of the web; and
 applying the force to the web using the set of clamps provided at each longitudinal end of the web, such that the magnitude of the force applied to the web at a height closest to the flange is less than the magnitude of the force applied to the web at a height furthest from the flange.

15. An aircraft structural component fabrication apparatus comprising:
 a force applicator configured to perform the apply a force to a component precursor that has a web and a flange that extends from the web, wherein the web comprises:
  a length;
  a height shorter than the length;
  a thickness shorter than the height;
  a first end proximal to the flange; and
  a second end distal from the flange;
 wherein the force applicator is configured to apply the force such that the force has a magnitude that varies along the height of the web to increase the length of the web to different extents between the first end of the web and the second end of the web, wherein the magnitude of the force applied to the component precursor varies from being:
  a minimum force magnitude at the first end of the web and a maximum force magnitude at the second end of the web; or
  the minimum force magnitude at the second end of the web and the maximum force magnitude at the first end of the web; and
 a jig on which a shaping of the component precursor is performable, wherein the shaping comprises curving the component precursor into a curved shape that has:
  a first radius of curvature at the first end of the web and a second radius of curvature at the second end of the web; or
  the first radius of curvature at the second end of the web and the second radius of curvature at the first end of the web;
  wherein the second radius of curvature is greater than the first radius of curvature.

16. The aircraft structural component fabrication apparatus according to claim 15, wherein:
 the force applicator comprises
 a plurality of clamps removably attachable to portions of a longitudinal end of the web at respective points along the height of the web; and
 the clamps are operable independently of each other to hold the web while the force, which has the magnitude that varies along the height of the web, is applied, so as to increase the length of the web to different extents between the first end of the web and the second end of the web.

17. The aircraft structural component fabrication apparatus according to claim 16, wherein:
 each of the clamps has a resilient contact surface; and
 the clamps are configured to grip the web via respective resilient contact surfaces.

18. An aircraft structural assembly, comprising:
 an aircraft structural component fabricated by the method according to claim 1; and
 an aircraft skin section affixed to the flange of the aircraft structural component.

19. An aircraft comprising the aircraft structural assembly of claim 18.

\* \* \* \* \*